Oct. 26, 1943.                S. E. HILBLOM                2,332,719
                CONTROL MEANS FOR AGRICULTURAL IMPLEMENTS
                    Filed June 6, 1941            2 Sheets-Sheet 1
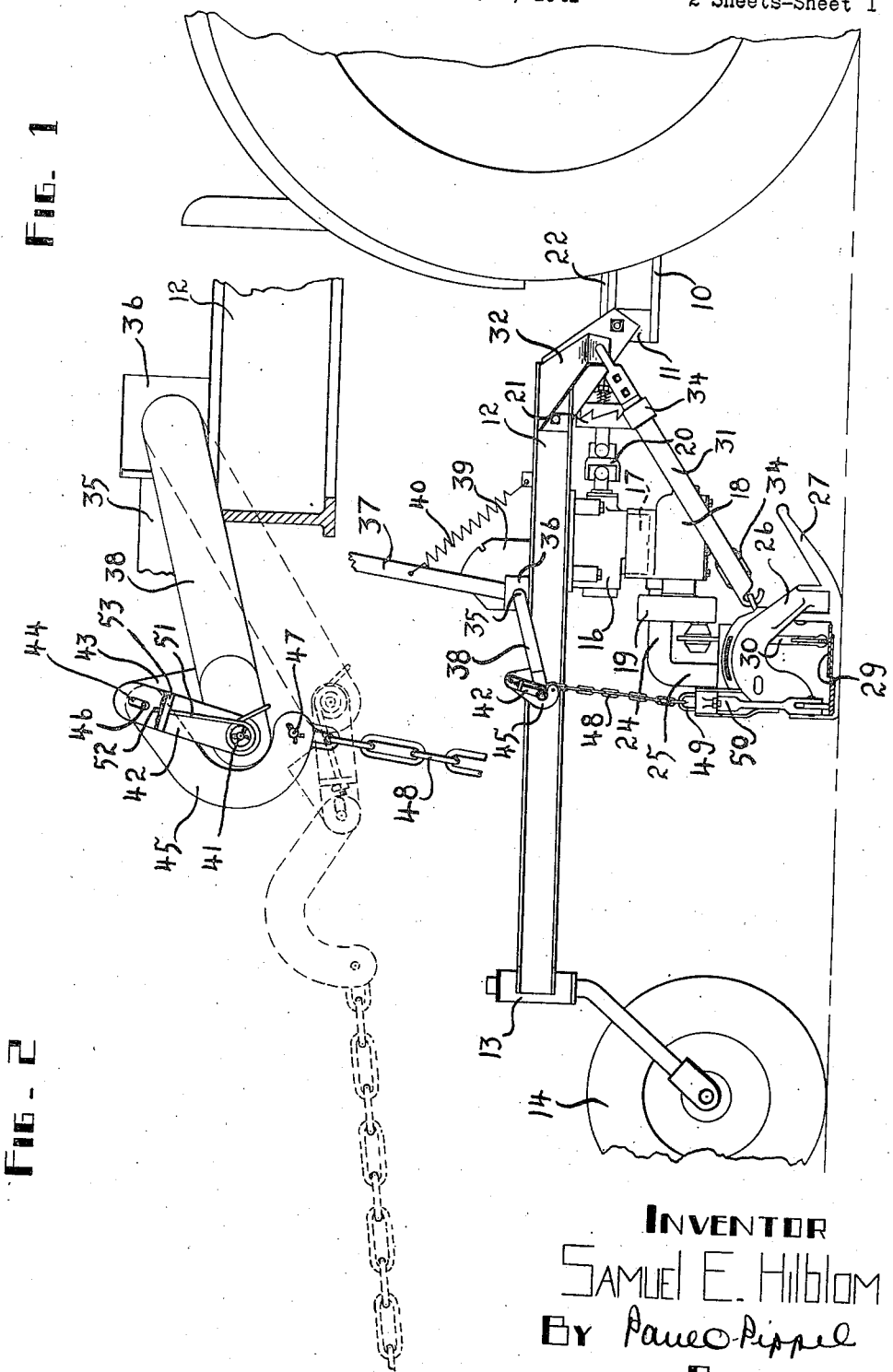
INVENTOR
SAMUEL E. Hilblom
BY Paul O. Pippel
    ATTY

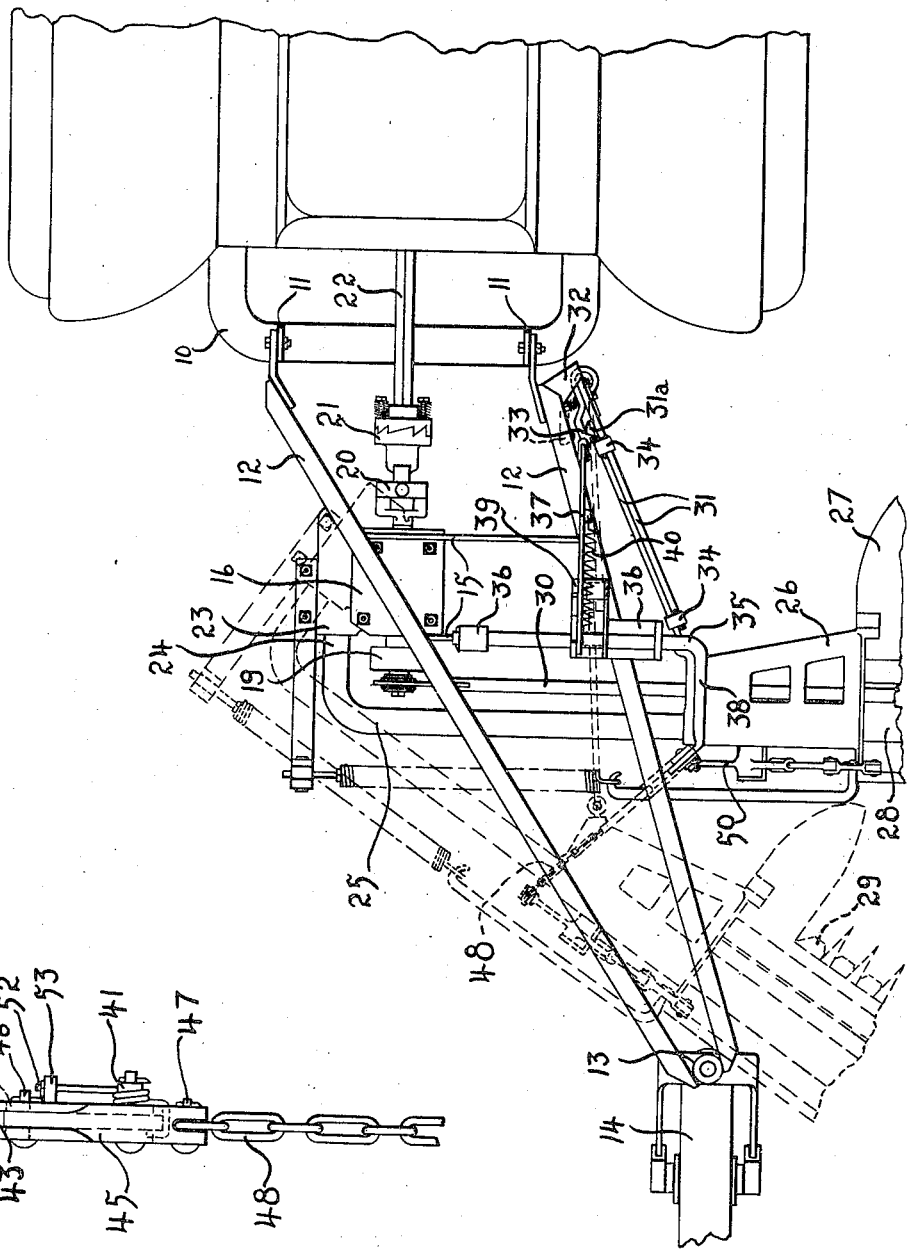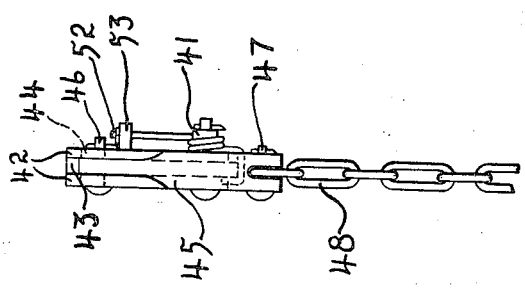

Patented Oct. 26, 1943

2,332,719

UNITED STATES PATENT OFFICE 2,332,719

CONTROL MEANS FOR AGRICULTURAL IMPLEMENTS

Samuel E. Hilblom, Chicago, Ill., assignor to International Harvester Company, a corporation of New Jersey Application June 6, 1941, Serial No. 396,898

6 Claims. (Cl. 56—25)

This invention relates to an agricultural implement, and, more particularly, to an agricultural implement of the mower or harvester type.

The invention is concerned primarily with the provision of control means for the cutting mechanism of a mower. Most mowers of the type to which the invention may be adapted are represented generally by that form of mower which consists of a supporting frame which carries the cutting mechanism. The cutting mechanism extends laterally from the supporting frame in a normal operating position and includes a cutter-bar for harvesting the crop at one side of the supporting frame. In mowers of the type connected to or carried on tractors or other vehicles it is a common expedient to mount the cutter-bar for releasable rearward swinging movement horizontally with respect to the supporting frame when the cutter-bar strikes an obstruction in the field. The purpose of this expedient is to eliminate the possibility of damage to the cutting mechanism, such means being more common in connection with tractor-drawn or tractor-connected mowers because of the high speed at which the mower is operated. Releasable means are provided for maintaining the normal operating position of the cutter-bar, this means being releasable upon excess pressure applied to the cutter-bar when it strikes the obstruction.

One of the principal problems arising in connection with the use of a mower of the type referred to is that involving the restoration of the cutter-bar to normal position after it has been released. Various forms of releasable means have been devised which permit automatic reconnection of the cutting mechanism upon reversing the tractor, after which the cutting mechanism can be raised until the obstruction is passed over. In connection with the release of the cutting mechanism from operating position, there is also involved the problem of accommodating the driving mechanism to the cutting mechanism, which drive usually takes the form of a telescopic or disconnectable drive shaft arrangement associated with the power take-off shaft of the tractor. Various forms of devices have been worked out to provide for an efficient and automatic restoration of the driving arrangement upon reconnection of the cutter-bar and restoration thereof to operating position.

The discussion of the foregoing problems is believed to render clear an appreciation of the problem which the present invention solves. In a mower of the type described there must necessarily be provided means for raising and lowering the cutting mechanism so that the height of cut may be regulated. The means is additionally necessary for the purpose of moving the cutter-bar vertically from operating position to transport position in which latter position the cutter-bar extends vertically at one side of the supporting frame. The ordinary lifting and lowering means is not satisfactory for use in a mower of this type, since the connection between that means and the cutting mechanism must be broken when the cutting mechanism swings rearwardly after striking an obstruction. One form of connection heretofore used is that in which the lifting connection is completely separable from the cutting mechanism or the lifting means upon rearward swinging of the cutting mechanism. However, this arrangement is not satisfactory because the complete separation requires that the operator dismount from the tractor in order to reconnect the parts for continued operation. Inasmuch as the other releasable elements of the mower construction, such as the releasable means and the releasable driving mechanism referrd to above, are substantially automatic in operation upon reconnection, it will be seen that a lifting connection which requires manual reconnection materially detracts from the efficient operation of the entire mower.

It is, accordingly, the principal object of the present invention to provide a lifting means for a mower or agricultural implement which is capable of release and automatic reconnection.

It is an important object of the present invention to provide a lifting connection which is not completely separable or disconnectable, the connection thus including means serving to limit relative horizontal swinging movement between the cutting mechanism and the supporting frame.

The invention seeks as another object to provide means which are releasable during horizontal swinging movement of the cutting mechanism but which remain connected during operation of the controlling or lifting means for adjusting the cutting mechanism vertically.

It is an object of the invention to provide means responsive to rearward swinging movement of the cutter-bar for effecting a release of the connection.

The invention seeks, as an additional object, to provide a means which may be adapted to any form of agricultural implement in which one part is carried by another part for relative movement through a plurality of ranges.

Other objects and features of the invention will appear in greater detail as the following description is made of a preferred form of the invention as applied to a tractor-connected mower of a well known type.

In the drawings:

Figure 1 is a side elevational view of a tractor-connected mower embodying therein a preferred form of the invention;

Figure 2 is an enlarged view of portions of the lifting mechanism, the figure further illustrating in broken lines the extended positions of the parts comprising that mechanism;

Figure 3 is a plan view of the structure shown in Figure 1; and,

Figure 4 is an enlarged rear view of a portion of the lifting mechanism.

The mower chosen for the purpose of illustration is shown as being connected to the rear end of a tractor. Only a portion of the tractor is shown, this portion including a draw-bar 10 having thereon a pair of laterally spaced ears 11 providing a pivot on a horizontal axis for the forward end of a mower part or supporting frame 12. This frame comprises a pair of members which converge rearwardly of the tractor and slightly laterally thereof to a point at which they are connected by a bracket 13 which forms a bearing for the axle of a rear caster wheel 14. An intermediate portion of the frame 12 is provided with a support comprising a pair of longitudinaly spaced members 15 across-connected between the members of the frame and carrying a housing 16. This housing includes a downwardly extending sleeve portion 17 which forms a pivot on a vertical axis for the mounting of a complementary housing 18. The housing 18 carries a rearwardly extending shaft, not shown, for driving a fly-wheel 19. The housings 16 and 18 contain suitable gearing, not shown, for driving the fly-wheel 19. This gearing and the arrangement between the housings, providing for the pivot on a vertical axis, form no part of the present invention and are illustrated and described generally only for the purpose of enabling a clearer understanding of the operation of the invention in connection with the mower illustrated. The parts just referred to are adequately illustrated and described in assignee's patent to C. R. Raney et al. No. 2,166,967, dated July 25, 1939, and reference is had thereto for a detailed disclosure of the aforesaid parts. The drive mechanism contained in the housings 16 and 18 is driven by a suitable drive shaft arrangement connected to the power take-off shaft of the tractor. For the purpose of the present illustration, the drive shaft is shown as being of the flexible and telescopic type including a universal joint connection 20, a slip clutch 21, and a telescoping drive shaft 22, the latter being connected to the tractor power take-off shaft.

The lower housing 18 includes at one side thereof a sleeve portion 23 which provides a journal or bearing on a horizontal longitudinal axis for a forwardly extending portion 24 of a coupling bar 25. The coupling bar is thus mounted in the housing 18 for vertical movement about the horizontal longitudinal axis provided by the association between the parts 23 and 24. This vertical movement is also relative to the supporting frame 12. The coupling bar extends laterally grasswardly and carries in the conventional fashion a yoke 26 which is in turn connected to an inner shoe 27 of the mower cutting mechanism. The shoe carries a laterally extending cutter-bar 28 provided in the usual manner with a knife 29 which is operated by a reciprocating pitman 30 connected at its inner end to the fly-wheel 19 previously described. This structure comprises generally the cutting mechanism of the mower and the entire unit from the coupling bar to the cutter-bar is carried on the supporting frame 12 for vertical movement about the horizontal axis provided at 23 and for horizontal movement about the vertical axis between the housings 16 and 18, all of which is described in greater detail below.

In its normal operating position the cutter-bar extends, of course, laterally at one side of the supporting frame 12. Because of the arrangement between the housings 16 and 18 by which the sleeve 17 forms a pivot on a vertical axis, the cutting mechanism may have rearward movement horizontally with respect to the frame 12. According to a well known form of construction, releasable means are provided for maintaining the normal position of the cutting mechanism with respect to the supporting frame. In the present instance this means takes the form of a pair of extensible, longitudinally disposed bars 31, one of which is connected to the yoke 26 and the other of which is connected to a depending bracket 32 carried at the forward end of one side of the frame 12. One of the members 31 is provided with a latch portion 31a which is engaged by a spring-pressed element 33 carried by the other member 31. The members are maintained in side-by-side relation by a pair of guide members or straps 34. The straps 34 are engageable upon release of the latch 31a, 33 to limit rearward swinging of the cutting mechanism, as shown in broken lines in Figure 3. When the tractor is backed toward the released cutting mechanism, the tractor and cutting mechanism move toward each other and the releasable mechanism comprising the members 31 is automatically restored to normal position, the latch members 31a and 33 being automatically reengaged. The telescopic drive shaft is also capable of automatic reconnection in an obvious manner.

As best shown in Figures 1 and 2, the mower includes control means for raising and lowering the cutter-bar for the regulation of the height at which the crop is to be cut. In a preferred construction this control means comprises a control element in the form of a rock-shaft 35 rockably carried in bearings 36 on the frame 12. The rock-shaft rigidly carries an upstanding operating lever 37 and includes on the grassward side of the frame a rearwardly extending crank arm 38. A quadrant 39 is carried by the frame 12 for cooperation with the lever 37. A tension spring 40 is connected between the lever and the frame and serves to urge the lever forwardly toward the tractor.

The rearward end of the crank arm 38 of the rock-shaft 35 is provided with pivot pin 41 disposed on a transverse horizontal axis. This pin serves to mount on the arm 38 a first member 42 comprising part of a lifting connection between the control element and the cutting mechanism. The member 42 comprises a pair of links rigidly connected together in laterally spaced relation and including a stop member 43 normally engageable with an upper portion of the arm 38. The end of the member 42 opposite the pivot 41 is provided with a slot 44 which extends longitudinally of the member, or substantially vertically as respects the mower in general. The lifting connection further includes a second member 45 generally in the form of a hook or C which at one end carries a transverse pin 46 which engages the slot 44 in the member 42. The hook member 45 is provided at its other end with a transverse pin 47 to which is connected one end of a flexible connecting element in the form of a chain 48. The other end of the chain is connected as at 49 to a conventional form of gag lever arrangement 50 carried by the yoke 26. A torsional spring 51 is carried by the pin 41 and has one end engaging the arm 38 and its other end, as at 52, engaging an ear 53 on the member 42. This spring serves to maintain the member 42 in its forwardmost position with the stop 43 thereon as at 52, engaging an ear 53 on the member 42, engaging the top of the arm 38.

In the normal operating position of the cutting mechanism, as shown in Figure 1, the line of force through the lifting connection is forwardly of the pivot pin 41. This relation of parts is clearly illustrated in the full line position of the parts in Figure 2. Thus, the lifting lever 37 may be operated for raising and lowering the cutting mechanism, and the members 42 and 45 remain as though formed of one part. At no time during raising and lowering of the cutting mechanism can the members 42 and 45 have pivotal movement with respect to each other or with respect to the crank arm 38. The tension spring 40 is connected between the frame 12 and the lever 37 and serves to maintain the lever in its forwardmost position so that the lifting chain 48 is normally taut; and the torsional spring 51 carried by the pin 41 serves to maintain the member 42 in its forwardmost position. There is thus provided an overcenter locking arrangement which normally prevents movement of the parts 42 and 45 with respect to the crank arm 38. The quadrant 39 is preferably formed with but one notch therein to be engaged by the lever 37, this arrangement permitting free floating movement of the cutting mechanism vertically with respect to the frame 12. The single notch in the quadrant is utilized for the purpose of locking the lever 37 in a forward position when the cutting mechanism is raised. As is well known to those versed in the art, operation of the gag lever mechanism by the control lever serves to raise and lower the cutter-bar with respect to the mower shoe, and continued movement of the control lever serves to raise the cutter-bar to a position in which it extends substantially vertically at one side of the supporting frame. When this movement is effected, the mower shoe is likewise raised from the ground. This position is commonly referred to as the transport position of the cutting mechanism.

The general mower construction just described is operated in the usual manner. When the cutter-bar 28 strikes an obstruction, force or pressure is supplied to the cutter-bar in a direction opposing its continued forward movement. The members 31 of the release means become separated and relatively extensible to permit the cutting mechanism to swing rearwardly, as illustrated in the broken lines in Figure 3. The guide members 34, as previously stated, serve to limit rearward swinging so that the cutter-bar does not pass under the caster wheel 14.

Upon the intial rearward swinging movement of the cutting mechanism, the crank arm 38 of the rock-shaft 35 is moved downwardly because of the pull exerted by the lifting chain 48, as shown in broken lines in Figure 2. When the arm 38 reaches this position, the line of force between the pin 46 on the member 42 and the point 49 between the chain 48 and the gag lever 50, is moved rearwardly or to the other side of the pivot pin 41. The overcenter lock is accordingly broken or released and the members 42 and 45 extend or literally unfold to accommodate the continued rearward swinging of the cutting mechanism. The rock-shaft 35 and crank arm 38 remains, of course, in position on the frame 12, with the possible exception of limited rocking of the rock-shaft as respects the frame. As the cutting mechanism swings rearwardly, the lifting connection, which includes the parts 42 and 45 and the chain 48, assumes the broken-line position ilustrated in Figures 2 and 3. As best shown in Figure 3, the rearwardmost end of the crank arm 38 is bent inwardly to extend generally in the direction of the angle which the parts assume when extended upon release. The slot 44 in the member 42 allows the pin 46 to slide therein, thus increasing the amount of movement that the cutting mechanism may have with respect to the frame.

This slot may be of varying lengths or may be omitted entirely. It will be noted that the parts in the lifting mechanism are not entirely or completely separable but are rather extensible or partially disconnectable. This arrangement serves to permit the relative horizontal movement between the frame and cutting mechanism and at the same time serves to limit rearward swinging movement of the cutting mechanism.

When the cutting mechanism is swung forwardly to be restored to normal position, initial movement thereof relieves the lever 37 of the force originally imparted thereto by the pull of the lifting connection. The spring 40 then tends to urge the lever 37 forwardly. As the cutter-bar continues to move forwardly the lever 37 also moves forwardly and the arm 38 moves upwardly. At the same time the torsional spring 51 tends to return the member 42 to the full line position in Figure 2. The member 42 carries along with it the upper end of the member 45, and the cutting mechanism, moving forwardly, carries with it the lower end of the member 45. At the final movement of reconnection between the members 31 of the release means, the parts of the lifting mechanism are completely restored to normal operating position and the line of force between the pin 46 and the gag lever arrangement 50 is again forwardly of the pin 41 on the crank arm 38. The lifting mechanism may again be operated to regulate the height of the cutter bar.

From the foregoing description it will be seen that a preferred form of the invention has been provided for the accomplishment of the objects enumerated above. One of the aspects of the invention is the provision of a control means which is responsive to movement of a first part with respect to a second part in one direction but which is not disturbed from its normal position with respect to relative movement between the parts in another direction. The means also includes a limit or stop means for preventing complete separation of the parts upon extension or partial disengagement thereof. This latter means is important from the point of contributing materially to a general organization which stresses automatic reconnection of the parts of the implement, thus facilitating the use and operation of the mower or other implement to which the invention may be adapted. It will be understood, of course, that the invention may be practicably adapted to other uses and that various modifications and alterations may be made therein without departing from the spirit and scope of the invention as defined in the appended claims.

What is claimed is:

1. For an agricultural implement having a tractor and a mower connected to the tractor for vertical movement with respect thereto in a first range of movement and for additional relative horizontal movement in a second range, control means for regulating movement of the mower in the first range and including a control element positioned on the tractor to remain on said tractor during movement of the mower through either range; a connection between said element and the mower including a pair of members pivoted together for relative movement, releasable means normally connecting said members together against relative movement during operation of the control element for controlling the mower in its first range of vertical movement, said last named means being responsive to second range horizontal movement of the mower to release said members.

2. For an agricultural implement having a frame and a mower connected to the frame for vertical movement with respect thereto in a first range of movement and for additional relative horizontal movement toward and from the frame in a second range, control means for regulating movement of the mower in the first range and including a control element positioned on the frame to remain on said frame during movement of the mower through either range; a connection between said element and the mower including a pair of members pivoted together for relative movement, releasable means normally connecting said members together against relative movement during operation of the control element for controlling the second part in its first range of vertical movement, said last named means being responsive to second range horizontal movement of the mower away from the frame to release said members, and means for restoring said members to normal position upon return of the mower toward the frame through its second range.

3. For an agricultural implement having a draft member and a mower associated with the draft member for horizontal and vertical movement with respect thereto: means for regulating vertical movement of the mower including a control element movably carried on the draft member, and means connecting said element and the mower, said connecting means including a pair of members connected together for folding and unfolding and normally in folded position during vertical movement of the mower and unfoldable for horizontal movement of said mower.

4. For an agricultural implement having a draft vehicle and a mower associated with the first part for horizontal and vertical movement with respect thereto: means for regulating vertical movement of the mower including a control element movably carried on the draft vehicle, and means connecting said element and the mower, said connecting means including a pair of members connected together for folding and unfolding and normally in folded position during vertical movement of the mower and unfoldable for horizontal movement of said mower, and yieldable means normally retaining the members in folded position and yieldable upon initial movement of the mower through its horizontal movement to permit unfolding of said members.

5. For an agricultural implement having a frame and a mower associated with the frame for movement with respect thereto through a vertical and horizontal range: means for regulating the vertical range of movement of the mower including a control element movably carried on the frame and means connecting said element and the mower, said connecting means including a pair of members connected together for folding and unfolding and normally in folded position during the vertical range of movement of the mower and unfoldable for movement of said mower through the horizontal range, and means for returning the members to folded position upon return of the mower through the last named horizontal range of movement.

6. Control mechanism for an agricultural implement having a mower movable vertically and having further movement horizontally, comprising means for controlling said mower through vertical movement thereof, said means including a support, a control element movable on the support and a connection between the element and the movable mower, said connection including a plurality of extensible members and over-center locking means normally locking said members together and against extension during control of vertical movement of the movable mower and unlockable for extension of said members upon horizontal movement of said mower.

SAMUEL E. HILBLOM.

CERTIFICATE OF CORRECTION.

Patent No. 2,332,719. October 26, 1943.

SAMUEL E. HILBLOM.

It is hereby certified that error appears in the printed specification of the above numbered patent requiring correction as follows: Page 4, first column, line 17, claim 1, after "range" strike out the semicolon and insert instead a colon; and second column, line 10, claim 4, for "first part" read --draft vehicle--; and that the said Letters Patent should be read with this correction therein that the same may conform to the record of the case in the Patent Office.

Signed and sealed this 29th day of February, A. D. 1944.

Leslie Frazer (Seal) Acting Commissioner of Patents.